United States Patent [19]

Diekman et al.

[11] 3,723,447

[45] Mar. 27, 1973

[54] BENZOTHIAZOLE CERTAIN ETHERS AND AMINES OF 1,2,3-BENZOTHIAZOLE

[75] Inventors: John D. Diekman, Mountain View; John B. Siddall, Palo Alto, both of Calif.

[73] Assignee: Zoecon Corporation, Palo Alto, Calif.

[22] Filed: Apr. 5, 1971

[21] Appl. No.: 131,454

[52] U.S. Cl. ............260/304, 260/340.9, 260/486, 260/593 R, 260/638 A, 260/654, 424/270
[51] Int. Cl. .............................................C07d 91/56
[58] Field of Search......................................260/304

[56] References Cited

UNITED STATES PATENTS 3,275,646   9/1966   Kirby et al.............................260/304
3,536,728   10/1970  Yates et al............................260/304

*Primary Examiner*—Alex Mazel
*Assistant Examiner*—R. J. Gallagher
*Attorney*—Donald W. Erickson

[57] ABSTRACT

Ethers and amines of 1,2,3-benzothiadiazole prepared by alkylation of hydroxy-1,2,3-benzothiadiazole and amino-1,2,3-benzothiadiazole useful for the control of insects.

27 Claims, No Drawings

BENZOTHIAZOLE CERTAIN ETHERS AND AMINES OF 1,2,3-BENZOTHIAZOLE

This invention relates to ethers and amines of 1,2,3-benzothiadiazole of formula I and II, the preparation thereof and the control of insects.

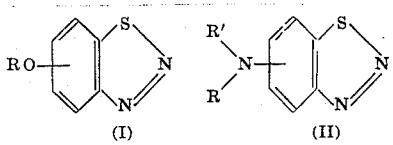

wherein,
R is the group

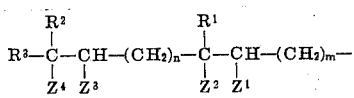

in which,
each of $R^1$, $R^2$ and $R^3$ is lower alkyl;
$Z^1$ is hydrogen and $Z^2$ is hydrogen or, taken with $Z^1$, a carbon-carbon bond;
$Z^3$ is hydrogen;
$Z^4$ is hydrogen, bromo, chloro, fluoro, $-OR^4$ or, taken with $Z^3$, a carbon-carbon bond or oxido;
n is the positive integer one, two or three;
m is zero or the positive integer one or two, provided that when m is zero — then $Z^2$ is hydrogen; and
$R^4$ is hydrogen, lower alkyl or carboxylic acyl, and
R' is hydrogen or the same as R. The ether bridge or amino bridge is attached to position C-5 or C-6 of the benzene ring.

The term "lower alkyl", as used herein, refers to an alkyl group, straight or branched, having a chain length of one to six carbon atoms. The term "carboxylic acyl", as used herein, refers to the acyl group of a carboxylic acid, anhydride or halide. The acyl group is determined by the particular carboxylic acid halide or carboxylic acid anhydride employed in the esterification of a compound of formula II where $R^4$ is hydrogen. Although no upper limitation need be placed on the number of carbon atoms contained in the acyl group within the scope of the present invention, generally it contains from one to 18 carbon atoms. Typical esters of the present invention include formate, acetate, propionate, enanthate, benzoate, trimethylacetate, trichloroacetate, trifluoroacetate, t-butylacetate, phenoxyacetate, cyclopentylpropionate, aminoacetate, β-phenylpropionate, 3,4-dimethyl-benzoate, p-isopropylbenzoate, cyclohexylacetate, stearate, methacrylate, p-chloromethylbenzoate, p-methoxybenzoate and p-nitrobenzoate.

The novel compounds of formula I and II are prepared by the alkylation of 5- or 6-hydroxy-1,2,3-benzothiadiazole and 5- or 6-amino-1,2,3-benzothiadiazole of formulas I' or II'

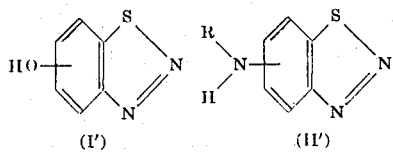

using a halide of the formula III

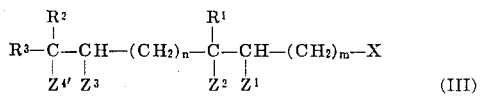

in the above formulas $Z^4$ is hydrogen, $-OR^4$ (in which $R^4$ is hydrogen or lower alkyl) or, taken with $Z^3$, a carbon-carbon bond or oxido and X is bromo, chloro or iodo. All other symbols have the same meaning as given above.

Ethers of the present invention are prepared reacting an alkylating agent of formula III with a salt of the hydroxy I' in an organic solvent inert to the reaction at about room temperature to reflux temperature. The reaction is generally carried out by first forming a salt by the addition of a base such as potassium carbonate, sodium hydride, or the like, to the hydroxy-1,2,3-benzothiadiazole in an organic solvent such as ether, tetrahydrofuran, dimethylformamide, dimethylacetamide, dimethylsulfoxide, or the like, followed by addition of the alkylating agent III.

The amines of the present invention are prepared by reacting an alkylation agent of formula III with an amine of formula II' in an organic solvent in the presence of a base. The reaction usually affords a mixture of secondary and tertiary amines, the tertiary amine being favored by using an excess of the halide III.

Epoxides ($Z^4$ taken with $Z^3$ is oxido) of formula I and II are prepared by treatment of the terminal double bond of a compound of formula I or II, wherein $Z^4$ taken with $Z^3$ is a carbon-carbon bond, with m-chloroperbenzoic acid, perbenzoic acid, perphthalic acid, or the like.

Halides of formula I and II ($Z^4$ is bromo, chloro or fluoro) are prepared by treating the terminal double bond with the terminal double bond with the appropriate dry hydrogen halide in an organic solvent.

Alkoxy derivatives of formula I or II ($Z^4$ is $-OR^4$ in which $R^4$ is lower alkyl) are prepared by treating the terminal double bond of a compound of formula I or II with mercuric salt in the presence of the appropriate lower alcohol followed by reduction of the oxy-mercurial intermediate with sodium borohydride, hydrazine or sodium amalgam. Hydroxy derivatives of formula I and II ($Z^4$ is $-OH$) are prepared by mercuric salt treatment of the terminal double bond in the presence of water followed by reduction of the oxy-mercurial intermediate. The thus-prepared hydroxy derivatives by reaction with carboxylic acid chloride, bromide or anhydride provides the compounds of formula I and II, wherein $Z^4$ is $-OR^4$ in which $R^4$ is carboxylic acyl.

The preparation of the precursors of formula I' and II' can be accomplished as described by British Pat. No. 1,176,799; Kirby et al., J. Chem. Soc.(C), 2250 (1970); Hodgson and Dodgson, J. Chem. Soc. 1002 (1948); Ward et al., J.Chem. Soc. 2825 (1961); and Ward et al., ibid, 2374 (1962). The use of compounds of formula I' and II' and derivatives thereof as insecticide synergists, insecticides, herbicides and fungicides is described by Felton et al., J. Agr. Food Chem., 18 No. 4,671 (1970) and British Pat. No. 1,176,799.

The novel compounds of formula I and II are useful for the control of insects. The utility of these compounds as insect control agents is believed to be attributable to their juvenile hormone activity. They are preferably applied to the immature insect, namely — during the embryo, larvae or pupae stage in view of their ability to affect metamorphosis and reproduction and otherwise cause abnormal development. These compounds are effective control agents for Hemipteran, such as Lygaeidae, Miridae and Pyrrhocoridae; Coleopteran, such as Tenebrionidae; Lepidopteran, such as Pyralidae, Noctuidae and Gelechiidae; Dipteran, such as mosquitos; Orthoptera, such as roaches; and Homoptera, such as aphids. The compounds of the present invention are particularly effective control agents for bugs such as the family Miridae, e.g., *Lygus hesperus*. The compounds can be applied at dosage levels of the order of 0.1 μg. to 50 μg. per insect. Suitable carrier substances include liquid or solid carriers, such as water, mineral or vegetable oils, talc, silica and natural or synthetic resin. The control of insects in accordance with the present invention is accomplished by spraying, dusting or exposing the insects to the vapor of the novel compounds. Generally, a concentration of less than 75 percent of the active compound is employed. The formulation can include insect attractants, emulsifying agents and wetting agents to assist in the application and efficiency of the active ingredient.

The following examples are provided to illustrate the present invention. Temperature is given in degrees Centigrade.

EXAMPLE 1

To a mixture of 152 mg. of 6-hydroxy-1,2,3-benzothiadiazole and 300 mg. of sodium carbonate, at 0°, is added 5 ml. of anhydrous dimethylformamide and 250 mg. of 3,7-dimethylocta-2,6-dienyl bromide. The reaction mixture is allowed to stand overnight with stirring and then is filtered directly into separatory funnel followed by extraction with hexane:ether (50:50). The organic layer is washed twice with cold 2N sodium hydroxide, water and brine, dried over magnesium sulfate and evaporated to give 6-(3',7'-dimethylocta-2',6'-dienyloxy)-1,2,3-benzothiadiazole.

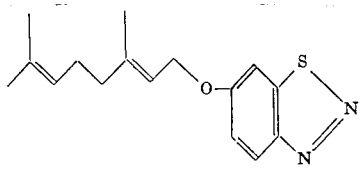

The above process is repeated using potassium carbonate in place of sodium carbonate to prepare the same product.

EXAMPLE 2

To a solution of 316 mg. of 6-(3',7'-dimethylocta-2',6'-dienyloxy)-1,2,3-benzothiadiazole in 8 ml. of methylene chloride, under nitrogen and cooled to 0°, is slowly added 230 mg. of m-chloroperbenzoic acid (85 percent) in about 5 ml. of methylene chloride. After about 30 minutes, the mixture is poured into 5% sodium sulfite, shaken and then separated. The organic phase is washed with saturated sodium bicarbonate and brine, dried over magnesium sulfate and evaporated to yield crude 6-(6',7'-oxido-3'7'-dimethyloct-2'-enyloxy)-1,2,3-benzothiadiazole which is purified by recrystallization.

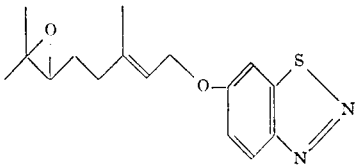

EXAMPLE 3

To a solution of 2 g. of 6-(3',7'-dimethylocta-2',6'-dienyloxy)-1,2,3-benzothiadiazole in 20 ml. of ethanol, cooled to 0° by an ice-bath, is added a suspension of 2.3 g. of mercuric acetate in 50 ml. of ethanol over 15 minutes. The reaction mixture is stirred for 2 hours and then, with cooling, 1.2 g. of potassium hydroxide in 20 ml. of ethanol is added. Then 0.14 g. of sodium borohydride is added in small portions and stirring continued 30 minutes. The solution is decanted, then concentrated to half volume, diluted with water and extracted with ether. The ether extracts are combined, washed, dried over magnesium sulfate and evaporated to yield 6-(7'-ethoxy-3',7'-dimethyloct-2'-enyloxy)-1,2,3-benzothiadiazole.

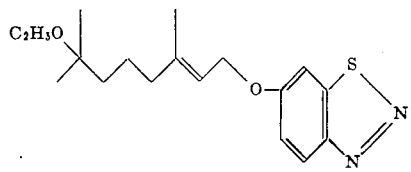

The use of methanol and other lower alcohols in place of ethanol in the foregoing process provides the respective alcohol addition products such as 6-(7'-methoxy-3',7'-dimethyloct-2'-enyloxy)-1,2,3-benzothiadiazole.

EXAMPLE 4

To a mixture of 1.9 g. of mercuric acetate, 6 ml. of water and 20 ml. of tetrahydrofuran is added 1.4 g. of 6-(3',7'-dimethylocta-2',6'-dienyloxy)-1,2,3-benzothiadiazole slowly. After addition is complete, the reaction mixture is stirred for about 20 minutes. The mixture is cooled to about 0° and 6 ml. of aqueous sodium hydroxide (3 molar) is added followed by 0.49 g. of sodium borohydride in aqueous sodium hydroxide (about 3 molor). The mixture is stirred for about 30 minutes. The mixture is then decanted, concentrated, washed with water, dried over magnesium sulfate and evaporated to yield 6-(7'-hydroxy-3',7'-dimethyloct-2'-enyloxy)-1,2,3-benzothiadiazole.

EXAMPLE 5

A mixture of 1 g. of 6-(7'-hydroxy-3',7'-dimethyloct-2'-enyloxy)-1,2,3-benzothiadiazole, 10 ml. of acetic anhydride and 0.5 g. of dry sodium acetate is refluxed for about 5 hours. After cooling, excess anhydride is removed by vacuum and the residue extracted with ether. The ethereal extract is washed, dried over magnesium sulfate and evaporated to yield the corresponding acetate 6-(7'-acetoxy-3',7'-dimethyloct-2'-enyloxy)-1,2,3-benzothiadiazole.

By using propionic anhydride, butyric anhydride, n-hexanoic anhydride and the like, the corresponding ester is prepared, alternatively, esters can be prepared using acyl chloride such as acetyl chloride in pyridine.

EXAMPLE 6

Anhydrous hydrogen chloride is bubbled into 100 ml. of dry carbon tetrachloride at 0° until one equivalent is taken up. Five grams of 6-(3',7'-dimethylocta-2',6'-dienyloxy)-1,2,3-benzothiadiazole is added and the resulting mixture allowed to stand for about 48 hours at 0°. The mixture is evaporated under reduced pressure to yield 6-(7'-chloro-3',7'-dimethyloct-2'-enyloxy)-1,2,3-benzothiadiazole.

By using each of hydrogen bromide and hydrogen fluoride in place of hydrogen chloride, the respective bromide and fluoride of the present invention is prepared.

EXAMPLE 7

A solution of 4.8 g. of 3,7-diethylnon-6-en-1-ol and 40 ml. of ether is added to 2.4 g. of phosphorus tribromide in ether at about −50° over about 30 minutes. The reaction mixture is stirred for 2 hours, poured onto ice and extracted with ether. The ether extracts are combined, washed with 10% sodium carbonate, water and saturated sodium chloride, dried over sodium sulfate and solvent removed to yield 3,7-diethylnon-6-enyl bromide.

In the same way, there is prepared 3-methyl-7-ethyl-non-6-enyl bromide.

EXAMPLE 8

A. To a solution of 20.9 g. of the ethylene ketal of 1-bromo-4-pentanone (obtained by treating 1-bromo-4-pentanone with ethylene glycol in benzene in the presence of p-toluene-sulfonic acid) in 100 ml. of benzene is added 20 g. of triphenylphosphine. The mixture is heated at reflux temperature for two hours and then filtered. The solid material thus-collected is washed with benzene, dried in vacuo and added to 6.49 g. of butyl lithium in 50 ml. of dimethylsulfoxide. The mixture is stirred until an orange solution is obtained and 38 g. of methyl ethyl ketone is then added. The mixture is stirred at about 25° for about 8 hours, poured into water and extracted with ether. The ethereal phase is concentrated and the concentrate added to 0.1N solution of hydrochloric acid in aqueous acetone and stirred for about 15 hours. The mixture is then poured into ice water and extracted with ethyl acetate. The extracts are combined, washed with water, dried over sodium sulfate and evaporated to yield 6-methyl-5-octen-2-one which is purified by chromatography and separated into the cis and trans isomer.

B. A mixture of 11.2 g. of diethyl carbomethoxymethylphosphonate in 100 ml. of dimethylformamide is treated with 2.4 g. of sodium hydride. The mixture is stirred until the evolution of gas ceases and then 10 g. of 6-methyl-5-octen-2-one is added slowly with stirring, maintaining temperature below 30°. The mixture is stirred for about 1 hour, then diluted with water and then extracted with ether. The ethereal phase is washed with water, dried over sodium sulfate and evaporated under reduced pressure to yield methyl 3,7-dimethyl-nona-2,6-dienoate as a mixture of isomers (trans,cis; trans,trans; cis,cis and cis,trans) which are separated by chromatography.

C. A solution of 2 g. of methyl 3,7-dimethylnona-2,6-dienoate in 20 ml. of dry ether is added with stirring to 0.4 g. of lithium aluminum hydride covered in ether at 0°. After about two hours, 2.5 ml. of acetic acid is added. The mixture is washed with ice water and the ether phase is dried and evaporated to give 3,7-dimethylnona-2,6-dien-1-ol.

D. A suspension of 0.5 g. of 5% palladium-on-carbon catalyst in 50 ml. of benzene is hydrogenated for 30 minutes. A mixture of 1.5 g. of 3,7-dimethylnona-2,6-dien-1-ol in 75 ml. of methanol is added and hydrogenated with agitation until the theoretical amount of hydrogen is absorbed. The catalyst is removed by filtration and the solution evaporated to yield a mixture containing the dihydro compounds which are separated by chromatography to yield 3,7-dimethylnon-6-en-1-ol.

The processes of Parts A, B and C are repeated starting with each of diethyl ketone, n-propylmethyl ketone, hexan-3-one and 2-methylpentan-3-one to yield 3-methyl-7-ethylnon-6-en-1-ol, 3,7-dimethyldec-6-en-1-ol, 3-methyl-7-ethyldec-6-en-1-ol and 3,8-dimethyl-7-ethylnon-6-en-1-ol, respectively, as the final product.

The synthesis of Parts A, B and C can be outlined as follows (φ is phenyl):

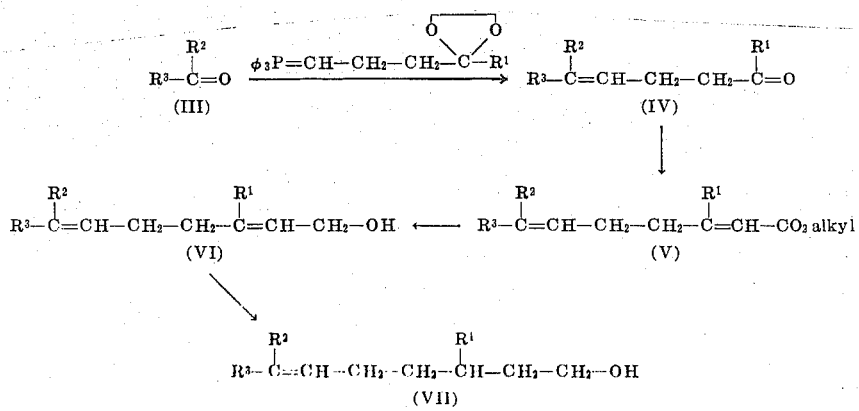

EXAMPLE 9

To a mixture of 4.0 g. of 6-amino-1,2,3-benzothiadiazole and 20 ml. of dimethylformamide is added 8 g. of 3,7-dimethylocta-2,6-dienyl bromide and 5.2 g. of potassium carbonate. The reaction mixture is heated at about 60° for 10 hours. The mixture is diluted with water, followed by extraction with ether. The organic phase is washed, dried over magnesium sulfate and evaporated to yield 6-(N-3',7'-dimethylocta-2',6'-dienylamino)-1,2,3-benzothiadiazole.

EXAMPLE 10

A mixture of 1 g. of 6-(7'-hydroxy-3',7'-dimethyl-oct-2'-enyloxy)-1,2,3-benzothiadiazole, 10 ml. of acetic anhydride and 0.5 g. of dry sodium acetate is heated at 80° for 40 hours. After cooling, excess anhydride is removed under vacuum and the residue extracted with ether. The ethereal extract is washed with water, dried over magnesium sulfate and evaporated to yield 6-(7'-acetoxy-3',7'-dimethyl-oct-2'-enyloxy)-1,2,3-benzothiadiazole.

EXAMPLE 11

The bromide of each of 3,7-dimethyloct-6-en-1-ol, 2,5-dimethylhex-4-en-1-ol, 3,7-dimethylnon-6-en-1-ol and 3-ethyl-7-methylnon-6-en-1-ol is reacted with 6-hydroxy-1,2,3-benzothiadiazole using the process of Example 1 to prepare the compounds under column I.

I 6-(3',7'-dimethyloct-6'-enyloxy)-1,2,3-benzothiadiazole,
6-(2',5'-dimethylhex-4'-enyloxy)-1,2,3-benzothiadiazole,
6-(3',7'-dimethylnon-6'-enyloxy)-1,2,3-benzothiadiazole,
6-(3'-ethyl-7'-methylnon-6'-enyloxy)-1,2,3-benzothiadiazole.

Each of the thus-prepared compounds is treated with m-chloroperbenzoic acid using the process of Example 2 to prepare the respective epoxides:
6-(6',7'-oxido-3',7'-dimethyloctyloxy)-1,2,3-benzothiadiazole,
6-(4',5'-oxido-2'-5'-dimethylhexyloxy)-1,2,3-benzothiadiazole,
6-(6',7'-oxido-3',7'-dimethylnonyloxy)-1,2,3-benzothiadiazole,
6-(6',7'-oxido-3'-ethyl-7'-methylnonyloxy)-1,2,3-benzothiadiazole.

EXAMPLE 12

Following the procedure of Example 3, each of the unsaturated compounds under column I is converted into the ethoxy derivative — that is,
6-(7'-ethoxy-3',7'-dimethyloctyloxy)-1,2,3-benzothiadiazole,
6-(5'-ethoxy-2',5'-dimethylhexyloxy)-1,2,3-benzothiadiazole,
6-(7'-ethoxy-3',7'-dimethylnonyloxy)-1,2,3-benzothiadiazole,
6-(7'-ethoxy-3'-ethyl-7'-methylnonyloxy)-1,2,3-benzothiadiazole.

The use of methanol in place of ethanol in the foregoing process provides the respective methoxy derivatives, e.g., 6-(7'-methoxy-3',7'-dimethyloctyloxy)-1,2,3-benzothiadiazole.

Similarly, following the procedure of Example 4, the hydroxy derivatives are prepared, e.g., 6-(7'-hydroxy-3',7'-dimethyloctyloxy)-1,2,3-benzothiadiazole, which can be esterified using the procedure of Example 5 or 10 to prepare the esters.

EXAMPLE 13

By use of the procedure of Example 6, the chloride derivatives of the compounds under column I are prepared, — that is,
6-(7'-chloro-3',7'-dimethyloctyloxy)-1,2,3-benzothiadiazole,
6-(5'-chloro-2',5'-dimethylhexyloxy)-1,2,3-benzothiadiazole,
6-(7'-chloro-3',7'-dimethylnonyloxy)-1,2,3-benzothiadiazole, and
6-(7'-chloro-3'ethyl-7'-methylnonyloxy)-1,2,3-benzothiadiazole.

EXAMPLE 14

Each of 3,7-diethylnon-6-enyl bromide, 3,7-diethylnona-2,6-dienyl bromide, 3-methyl-7-ethylnon-6-enyl bromide and 3-methyl-7-ethylnona-3,6-dienyl bromide is used as the starting material in the process of Example 1 to yield:
6-(3',7'-diethylnon-6'-enyloxy)-1,2,3-benzothiadiazole,
6-(3',7'-diethylnona-2',6'-dienyloxy)-1,2,3-benzothiadiazole,
6-(3'-methyl-7'-ethylnon-6'-enyloxy)-1,2,3-benzothiadiazole, and
6-(3'-methyl-7'-ethylnona-2',6'-dienyloxy)1,2,3-benzothiadiazole.

Using the process of Example 2, the epoxides of each of the thus-obtained compounds is prepared, i.e., 6-(6'-7'-oxido-3', 7'-diethylnonyloxy)-1,2,3-benzothiadiazole, etc.

EXAMPLE 15

Using the process of Example 1, 6-(3',7'-dimethyloctyloxy)-1,2,3-benzothiadiazole is obtained from 3,7-dimethyloctyl bromide.

EXAMPLE 16

Each of the bromides of Example 11, first paragraph, is used as the starting material in the process of Example 9 to prepare the amines under column II.

II 6-(N-3',7'-dimethyloct-6'-enylamino)-1,2,3-benzothiadiazole
6-(N-2',5'-dimethylhex-4'-enylamino)-1,2,3-benzothiadiazole
6-(N-3',7'-dimethylnon-6'-enylamino)-1,2,3-benzothiadiazole
6-(N-3'-ethyl-7'-methylnon-6'-enylamino)-1,2,3-benzothiadiazole By using excess bromide alkylating agent and a longer reaction time, the formation of tertiary amines if favored, e.g., 6-(N,N-bis-3'-7'-dimethylocta-2',6'-dienylamino)-1,2,3-benzothiadiazole, 6-(N,N-bis-3',7'-dimethyloct-6'-enylamino)-1,2,3-benzothiadiazole, etc.

Epoxidation of the amines of Example 9 and 16 using the procedure of Example 2 affords 6-(N-6',7'-oxido-3',7'-dimethyloct-2'-enylamine)-1,2,3-benzothiadiazole,6-(N-6',7'-oxido-3',7'-dimethyloctylamino)-1,2,3-benzothiadiazole,6-(N,N-bis-6',7'-oxido-3',7'-dimethloct-6'-enylamino)-1,2,3-benzothiadiazole, 6-(N,N-bis-6',7'-oxido-3',7'-dimethyloctylamino)-1,2,3-benzothiadiazole, etc.

EXAMPLE 17

Following the procedure of Example 3 each of the compounds of Example 9 and 16 is converted into the respective alkoxy derivative, e.g., 6-(N-7'-ethoxy-3',7' dimethyloct-2'-enylamino)-1,2,3-benzothiadiazole, 6-(N'-7'-ethoxy-3',7'-dimethyloctylamino)-1,2,3-benzothiadiazole, 6-(N'-7'-methoxy-3',7'-dimethyloctylamino)-1,2,3-benzothiadiazole, 6-(N'-7'-methoxy-3',7'-methoxy-3',7'-dimethyloctylamino)-1,2,3- benzothiadiazole, 6-(N,N-bis-7'-thoxy-3',7'-dimethyloct-2'-enylamino)-1,2,3-benzothiadiazole, 6-(N,N-bis-7'-ethoxy-3',7'-dimethyloctylamino)-1,2,3-benzothiadiazole, 6-(N,N-bis-7'-methoxy-3',7'-dimethyloctylamino)-1,2,3-benzothiadiazole, etc.

Similarly, following the process of Example 4, the hydroxy substituted compounds are prepared such as 6-(N-7'-hydroxy-3',7'-dimethyloct-2'enylamino)-1,2,3-benzothiadiazole, 6-(N-7'-hydroxy-3'.7'-dimethyloctylamino)-1,2,3-benzothiadiazole, etc. which, using the procedure of Example 5 or 10 are converted into the corresponding ester.

EXAMPLE 18

Each of the amines of Example 9 and 16 is used as the starting material in the process of Example 6 to prepare the respective chlorides, e.g., 6-(N-7'-chloro-3',7'-dimethyloct-2'-enylamino)-1,2,3-benzothiadiazole, 6-(N-7'-chloro-3',7'-dimethyloctylamino)-1,2,3-benzothiadiazole, 6-(N,N-bis-7'-chloro-3',7'-dimethyloct-2-enylamino)-1,2,3-benzothiadiazole, 6-(N,N-bis-7'-chloro-3',7'-dimethyloctylamino)-1,2,3-benzothiadiazole, etc.

EXAMPLE 19

The process of Example 1 is repeated using 5-hydroxy-1,2,3-benzothiadiazole in place of 6-hydroxy-1,2,3-benzothiadiazole to yield 5-(3',7'-dimethylocta-2',6'dienyloxy)-1,2,3-benzothiadiazole.

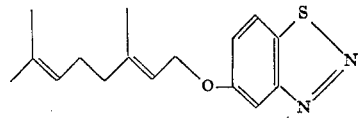

Similarly, there is prepared 5-(3',7'-dimethyloct-6'-enyloxy)-1,2,3-benzothiadiazole from 3,7-dimethyloct-6-enyl bromide.

What is claimed is:

1. A compound selected from those of the following formula I and II:

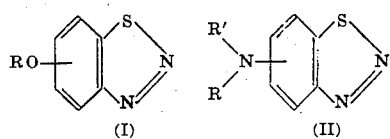

wherein,
R is the group

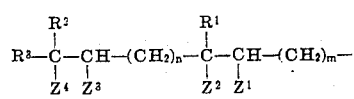

in which
each of $R^1$, $R^2$ and $R^3$ is lower alkyl;
$Z^1$ is hydrogen and $Z^2$ is hydrogen or, taken with $Z^1$, a carbon-carbon bond;
$Z^3$ is hydrogen;
$Z^4$ is hydrogen, bromo, chloro, fluoro, $-OR^4$ or, taken with $Z^3$, a carbon-carbon bond or oxido;
$n$ is the positive integer one, two or three;

$m$ is zero or the positive integer one or two, provided that $m$ is zero — then $Z^2$ is hydrogen;
$R^4$ is hydrogen, lower alkyl or carboxylic acyl of one to 18 carbon atoms; and
$R'$ is hydrogen or the same as R, the group $-OR$ and $-NRR'$ being in either position C-5 or C-6.

2. A compound according to formula I of claim 1 wherein $m$ is one and $n$ is two and the group $-OR$ is in position C-6.

3. A compound according to claim 2 wherein each of $Z^1$ and $Z^2$ is hydrogen and each of $R^1$, $R^2$ and $R^3$ is methyl or ethyl.

4. A compound according to claim 3 wherein 4 taken with $Z^3$ is a carbon-carbon bond or oxido.

5. A compound according to claim 4 wherein each of $R^1$, $R^2$ and $R^3$ is methyl.

6. A compound according to claim 3 wherein $Z^4$ is hydrogen, chloro or $-OR^4$ in which $R^4$ is hydrogen or lower alkyl of one to four carbon atoms.

7. A compound according to claim 6 wherein each of $R^1$, $R^2$ and $R^3$ is methyl.

8. A compound according to claim 7 wherein $Z^4$ is chloro or $-OR^4$.

9. A compound according to claim 2 wherein $Z^2$ taken with $Z^1$ is a carbon-carbon bond and each of $R^1$, $R^2$ and $R^3$ is methyl or ethyl.

10. A compound according to claim 9 wherein $Z^4$ is hydrogen, chloro, $-OR^4$ or, taken with $Z^3$, a carbon-carbon bond or oxido and $R^4$ is hydrogen or lower alkyl of one to four carbon atoms.

11. A compound according to claim 10 wherein $Z^4$ is chloro.

12. A compound according to claim 10 wherein $Z^4$ is $-OR^4$.

13. A compound according to claim 10 wherein $Z^4$ taken with $Z^3$ is a carbon-carbon bond or oxido.

14. A compound according to claim 13 wherein each of $R^1$, $R^2$ and $R^3$ is methyl.

15. A compound according to claim 2 wherein $m$ is zero or one; $n$ is one; each of $R^1$, $R^2$ and $R^3$ is methyl or ethyl and $Z^4$ taken with $Z^3$ is a carbon-carbon bond or oxido.

16. A compound according to claim 15 wherein m is zero.

17. A compound according to claim 16 wherein each of $R^1$, $R^2$ and $R^3$ is methyl.

18. A compound according to formula II of claim 1 wherein each of $R^1$, $R^2$ and $R^3$ is methyl or ethyl, $n$ is two and $m$ is one.

19. A compound according to claim 18 wherein $Z^4$ taken with $Z^3$ is a carbon-carbon bond or oxido.

20. A compound according to claim 19 wherein $R'$ is hydrogen.

21. A compound according to claim 19 wherein $R'$ is hydrogen and $Z^2$ taken with $Z^1$ is a carbon-carbon bond.

22. A compound according to claim 18 wherein $Z^3$ is hydrogen and $Z^4$ is chloro or $-OR^4$ in which $R^4$ is hydrogen or lower alkyl of one to three carbon atoms.

23. A compound according to claim 22 wherein $R'$ is hydrogen.

24. A compound according to claim 22 wherein R is hydrogen and $Z^2$ taken with $Z^1$ is a carbon-carbon bond.

25. A compound according to claim 20 wherein each of $R^1$, $R^2$ and $R^3$ is methyl.

26. A compound according to claim 23 wherein each of $R^1$, $R^2$ and $R^3$ is methyl.

27. A compound according to claim 18 wherein each of $R^1$, $R^2$ and $R^3$ is methyl, $m$ is zero, $n$ is one, each of $R'$ and $Z^1$ and $Z^2$ is hydrogen, and $Z^4$ is chloro, —$OR^4$ in which $R^4$ is hydrogen or lower alkyl of one to three carbon atoms, or, taken with $Z^3$, a carbon-carbon bond or oxido.

* * * * *